United States Patent
Topacio

(10) Patent No.: US 8,875,375 B2
(45) Date of Patent: Nov. 4, 2014

(54) FIRE ENGINE HOSE CONNECTOR

(71) Applicant: Eric Topacio, San Diego, CA (US)

(72) Inventor: Eric Topacio, San Diego, CA (US)

(*) Notice: Subject to any disclaimer, the term of this patent is extended or adjusted under 35 U.S.C. 154(b) by 0 days.

(21) Appl. No.: 13/922,966

(22) Filed: Jun. 20, 2013

(65) Prior Publication Data

US 2013/0276288 A1    Oct. 24, 2013

Related U.S. Application Data

(60) Division of application No. 13/035,708, filed on Feb. 25, 2011, now Pat. No. 8,827,320, which is a continuation-in-part of application No. 12/781,636, filed on May 17, 2010, now abandoned, which is a continuation-in-part of application No. 12/142,687, filed on Jun. 19, 2008, now abandoned.

(51) Int. Cl.
| | | |
|---|---|---|
| F16K 37/00 | (2006.01) | |
| A62C 37/00 | (2006.01) | |
| F16L 37/084 | (2006.01) | |

(52) U.S. Cl.
CPC ............. *A62C 37/00* (2013.01); *F16L 37/0847* (2013.01)
USPC ............ 29/469; 137/614.06; 285/87; 285/35; 285/312

(58) Field of Classification Search
USPC ......... 285/33, 62, 312, 311, 1, 80, 87, 35, 82; 29/463, 469; 137/614.06
See application file for complete search history.

(56) References Cited

U.S. PATENT DOCUMENTS

| | | | | |
|---|---|---|---|---|
| 999,169 | A * | 7/1911 | Jones | 285/107 |
| 4,722,555 | A * | 2/1988 | Soultatis | 285/5 |
| 5,535,984 | A * | 7/1996 | Anderson et al. | 251/149.9 |
| 5,947,530 | A * | 9/1999 | Harle | 285/276 |
| 6,382,247 | B1 * | 5/2002 | Gundry | 137/556.3 |
| 6,447,027 | B1 | 9/2002 | Lilley | |
| 6,450,542 | B1 | 9/2002 | McCue | |
| 6,843,506 | B2 * | 1/2005 | Osborne | 285/1 |
| 7,021,345 | B2 * | 4/2006 | Webb | 141/382 |
| 7,255,131 | B2 | 8/2007 | Paper | |
| 7,878,556 | B2 * | 2/2011 | Gammons | 285/369 |
| 2006/0174968 | A1 | 8/2006 | DeLuna | |
| 2007/0157972 | A1 | 7/2007 | Hendey | |

FOREIGN PATENT DOCUMENTS

| | | |
|---|---|---|
| JP | 2003-038676 A | 2/2003 |
| JP | 2003-299747 A | 10/2003 |
| KR | 10-2000-0050172 A | 8/2000 |
| KR | 10-0802158 B1 | 2/2008 |

* cited by examiner

*Primary Examiner* — David Bryant
*Assistant Examiner* — Jason L Vaughan
(74) *Attorney, Agent, or Firm* — Mark Wisnosky

(57) ABSTRACT

A method for using a fire engine hose connector system is reported. The system allows for rapid connection between the fire hose and the fire engine, and more importantly the system enables even more rapid disconnection. The fire engine and fire fighting personnel may make a rapid escape form an overtaking wildfire. The ability to rapidly disconnect and escape from the fire scene allows the fire engine and personnel to access hydrant supplies that would otherwise not be available due to safety procedures that preclude connection when the long disconnect time requirements of prior art connectors place the escape of the fire engine and personnel at risk in a rapidly moving fire.

6 Claims, 12 Drawing Sheets

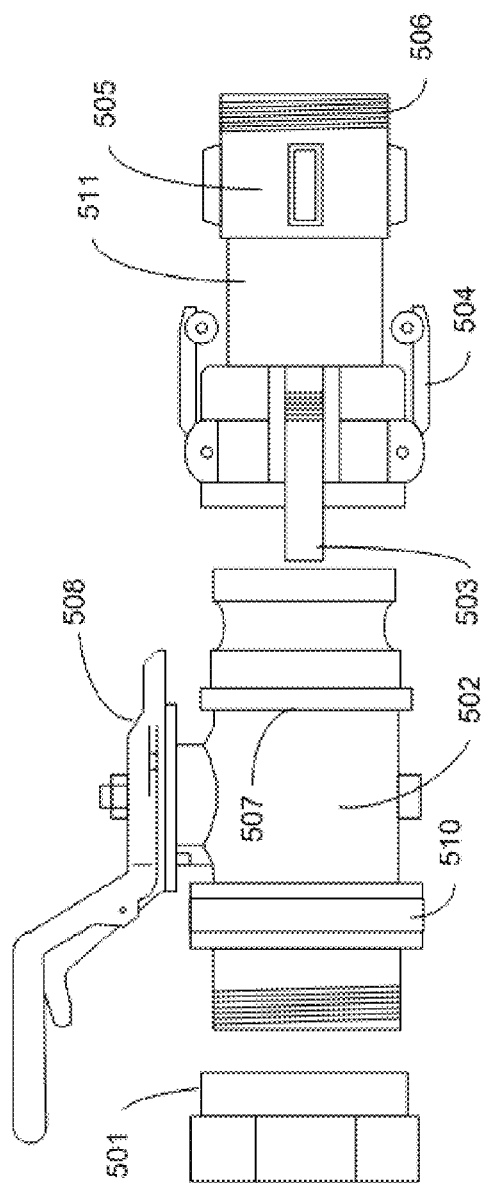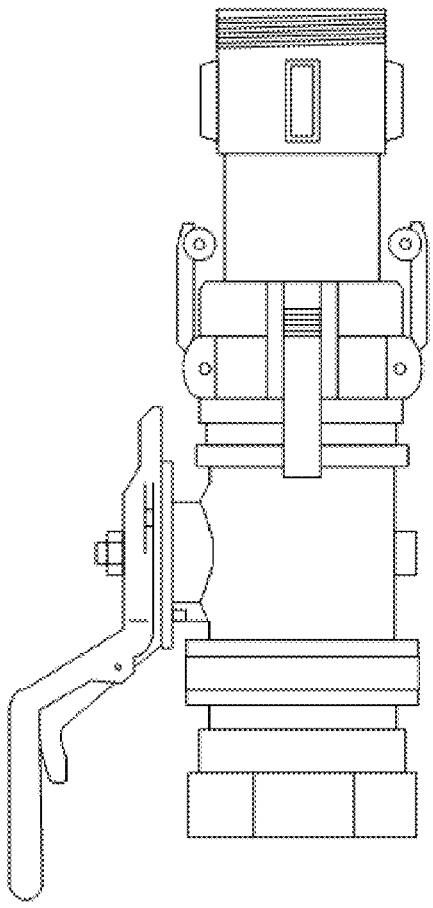
Figure 5E.
Figure 5F.

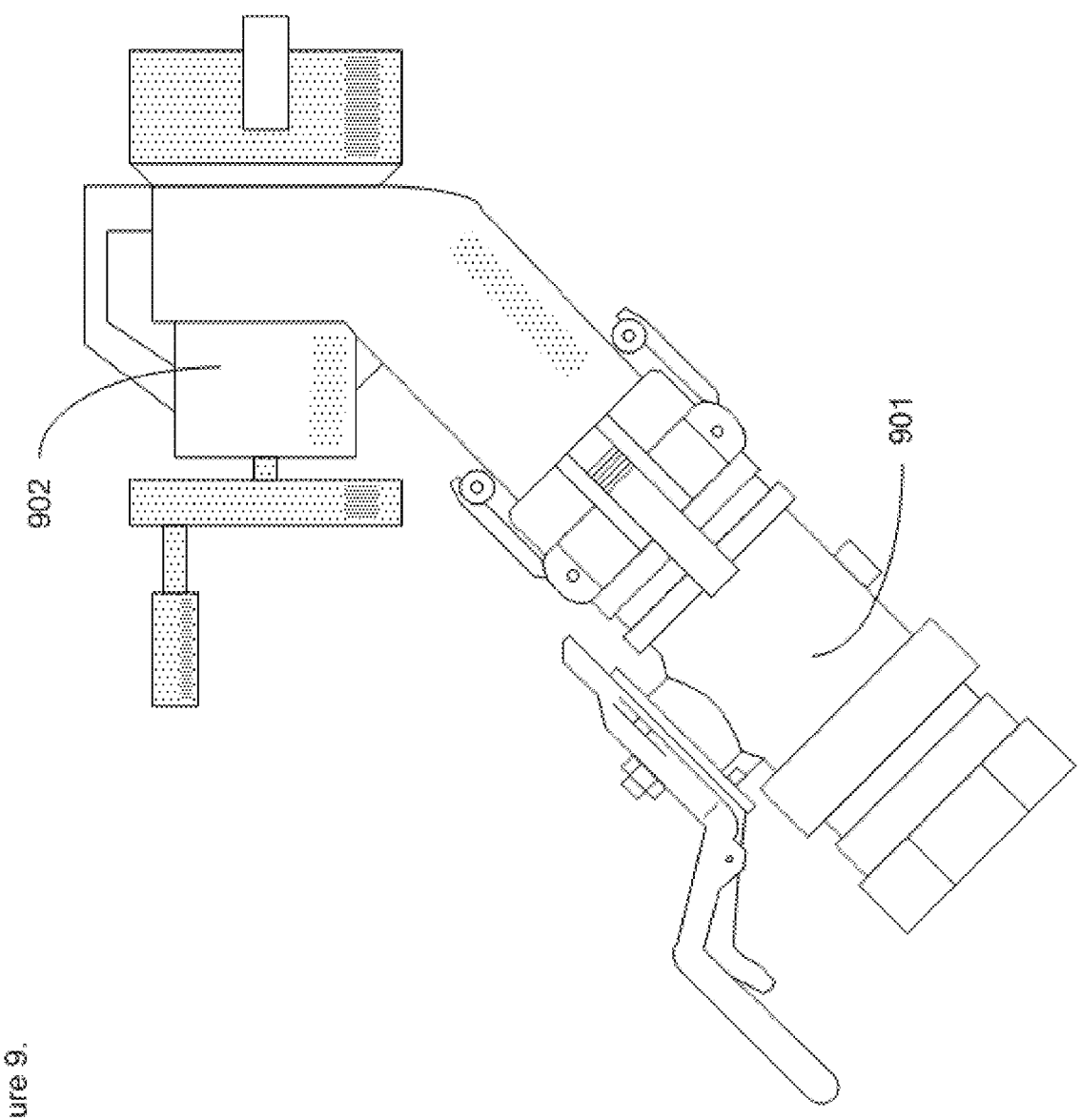

FIRE ENGINE HOSE CONNECTOR

CROSS-REFERENCE TO RELATED APPLICATIONS

This application is a divisional of application Ser. No. 13/035,708 filed 25 Feb. 2011 which is a continuation-in-part of application Ser. No. 12/781,636 filed 17 May 2010 which is a continuation-in-part of application Ser. No. 12/142,687 filed 19 Jun. 2008, all of which are incorporated herein by reference.

BACKGROUND OF THE INVENTION

1. Technical Field

The present invention relates to a quick-disconnect connector useful for connecting a fire engine to a fire hydrant.

2. Related Background Art

Brush fires are common throughout the southwestern United States as well as many other parts of the world. Often driven by strong desert winds these fires can consume thousands of acres of brush and destroy homes and other buildings in their paths. Winds in Santa Ana conditions in portions of Southern California can often reach 50 mile per hour and even higher in gusts. The shifting direction of these winds, especially on a local scale can result in unpredictable and rapidly changing direction for the driven fires. These winds drive the fires at such velocity that fire fighters are often in danger of being overrun by the fire they are on the ground to fight. The fires are fought with aerial drops of water and fire retardant, earth moving equipment and other mechanized means. However the primary weapon against these fires is still the firefighting crew on the ground using hand tools to create firebreaks and conventional fire pumper engines and water to douse the blaze. The priority is often to provide sufficient water on the fire or on homes in the path of the fire. These wildfires are not confined to remote forests or scrubland. Fires regularly erupt in populated areas. In these cases the availability of fire hydrants as a supply of water can be a great aid and lifesaver for the fire fighting crew. Otherwise the water supply of the ground crew is limited to what can be carried in the tank of a fire engine, typically 500 gallons. However, even when available the fire hydrants are not always used. The fire fighting crew must be ready to evacuate an area if the fire shifts or is simply overwhelmingly large and fast moving. The evacuation of an area must often be done very quickly. There is often not time to disconnect fire hoses from supply hydrants. This evacuation safety requirement often precludes connecting to a hydrant supply even when they are available. The time required to return to the hydrant, turn off the flow and disconnect the hose at least from the engine may be too long and cost lives. Safety procedures to ensure the safety of the fire fighting crew dictated by the restrictions of heretofore available equipment mean that fires are often fought just with the water that can be carried on the fire engine even when a hydrant supply is available. A means is needed to easily and rapidly connect and just as importantly disconnect a fire hose connection between a hydrant and a fire engine water supply inlet.

There have been improvements that address connections to a fire hydrant or to a fire engine but do not provide a solution to the problem of rapid disconnect without returning to the hydrant to stop the flow. The connection of a fire hose to a hydrant is facilitated by quick-connect fittings such as the Storz fitting described in U.S. Pat. No. 489,107. However this fitting allows just a rapid mechanical connection of the hose to the hydrant but does not address the issue of water flow. A Storz or similar fitting can also rapidly connect and disconnect from the fire engine. However the hose cannot be connected or disconnected to the hydrant with the hydrant turned on. Disconnecting the hose at the engine with the hose under pressure is not possible with current equipment. U.S. Pat. No. 6,447,027 similarly addresses the issue of rapidly connecting a hose to a fire hydrant. This invention also does not address the issue of rapidly disconnecting the hose. Other inventions such as U.S. Pat. No. 7,255,131 address aspects of connections to the fire hose but again do not solve the problem of rapidly disconnecting a hose from a fire engine. There is a need for a rapid hose connection that can be easily and rapidly attached to and detached from a fire engine without the requirement of returning to the hydrant to turn off the flow.

DISCLOSURE OF THE INVENTION

The invention comprises a 2-piece quick-disconnect connector that incorporates an integrated valve to allow water flow from the source side to be controlled on the source side of the connection to the fire engine. Thus, the quick-disconnect connector comprises a coupler that is adapted to fit to the standard connection on a fire engine water supply inlet and an adapter that provides a standard connection to a fire hose. The adapter also includes an integrated valve, which may be operated by means attached to either piece of the quick connect fitting. Typically both the fire hose connection and the fire engine connection are 4-inch diameter connections, but this dimension does not represent a size constraint on the invention. Other size connections for different hose and fire engine fittings can equally well be practiced under the invention.

Operation of the system follows attachment of the coupler to the fire engine water supply inlet fittings using appropriate fittings. A fire hose is attached to a hydrant using normal fittings known to those skilled in the art. The distal end of the fire hose is then attached to the adapter using an appropriate fitting. The integrated valve is initially in the closed position and the adapter is mated with the coupler on the fire engine inlet. The water supply at the hydrant is then turned on and the integrated valve is subsequently opened. Water flows from the hydrant through the quick-disconnect connector into the engine manifold, storage and pumping system. Disconnecting the system in an emergency such as being quickly overrun by a wildfire requires simply shutting the integrated valve off at the quick-disconnect connector and releasing the quick-disconnect fitting. The hose may then be left under pressure and temporarily abandoned as the engine drives away from danger. Disconnection is rapid because there is no need to leave the immediate vicinity of the engine, no need to go to the hydrant and stop the flow and relieve the pressure prior to disconnecting the hose at the engine.

BRIEF DESCRIPTION OF THE DRAWINGS

The novel features characteristic of the invention are set forth in the claims. The invention itself however as we all as the preferred mode of use, and further objects and advantages thereof, will best be understood by reference to the following detailed description of an illustrative embodiment when read in conjunction with the following drawings. Same features are numbered consistently throughout.

FIG. 5E shows an exploded view of an alternative embodiment incorporating a flexible section.

FIG. 5F shows an assembled view of the embodiment of FIG. 5E.

FIG. 9 shows an embodiment of the invention mated to a piston intake valve.

MODES FOR CARRYING OUT THE INVENTION

A connector and method of use that allows rapid connection, and in some cases more importantly, disconnection of a fire hose supply line between a hydrant and a fire engine is described. The connector allows rapid connection for quick set up and in an emergency may be disconnected from the engine to allow it to drive away without the need to return to the hydrant to shut off the supply or drain the fire hose.

Figure 1:
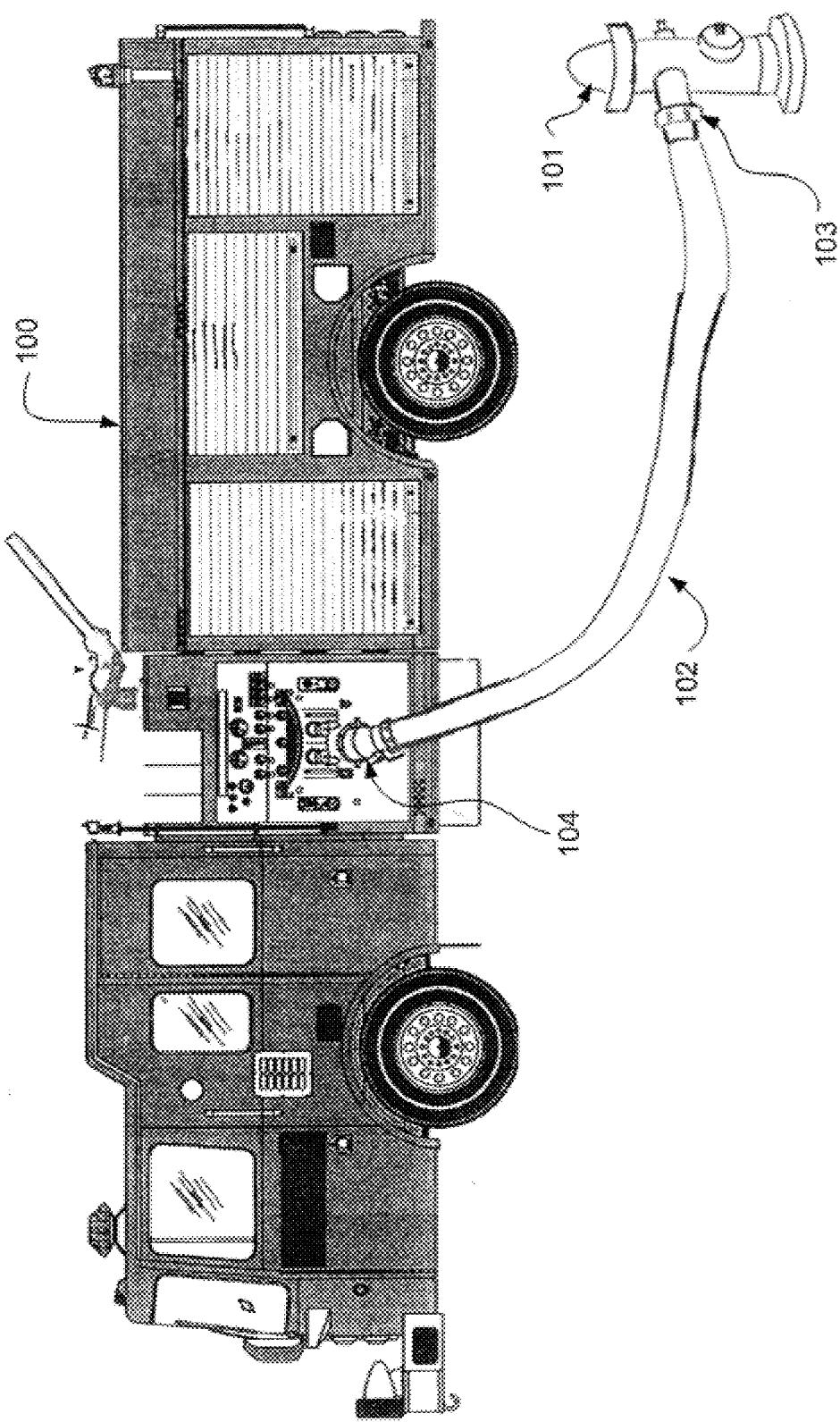
FIG. 1 shows the invention connected between a supply hose and the supply inlet of a fire engine.

Referring to FIG. 1, a fire engine 100 is attached to a hydrant 101 to provide a supply of water to the manifold, pumps and holding tanks of a typical fire engine. The conduit for the supply is typically a 4-inch diameter fire hose 102. At the hydrant end the connection is made through a Storz connector 103 or similarly threaded connector and adapter to attach the hose to the hydrant as is known in the art. The non-hydrant end of the hose is attached to an adapter 104 embodiment of the invention that allows connection of the hose to a coupler attached to the fire engine using a quick-disconnect fitting. FIG. 1 shows the connector with the hose attached to the engine.

Figure 2:
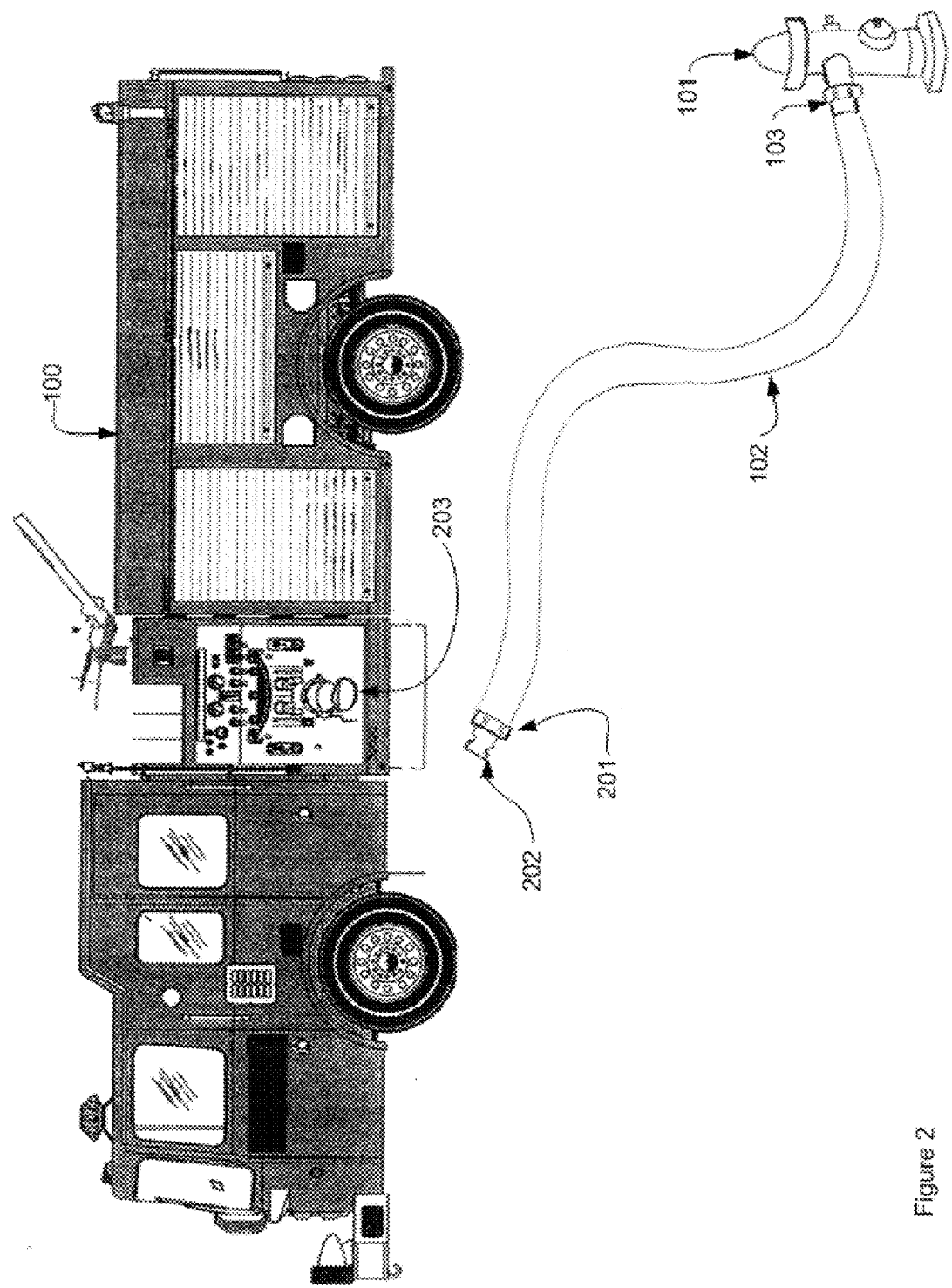
FIG. 2 shows the invention disconnected from the fire engine.

FIG. 2 shows the connector embodiment of FIG. 1 with the quick-disconnect connector disconnected from the engine, as would be the case prior to making the initial connection or in the case of disconnecting from the hydrant supply to enable rapid evacuation of the engine and crew. The fire hose 102 is connected to the hydrant 101 via a connector 103 such as a Storz connector or other equivalent connectors know in the art. The distal end of the fire hose is connected to a fitting 201 that is connected in turn to an adapter 202. Since the adapter 202 is disconnected from the coupler 203 which is attached to the engine, a spring loaded valve within the adapter 202 is actuated to prevent flow. If the hydrant 101 is in an on state the hose 102 will be charged with water at the hydrant pressure but no water will flow. The remaining coupler 203 may remain attached to the engine during a rapid evacuation procedure. Another embodiment shown in FIG. 2 comprises a fire engine 100 with a coupler 203 fit to accommodate a quick-disconnect adapter 202.

Figure 3A:
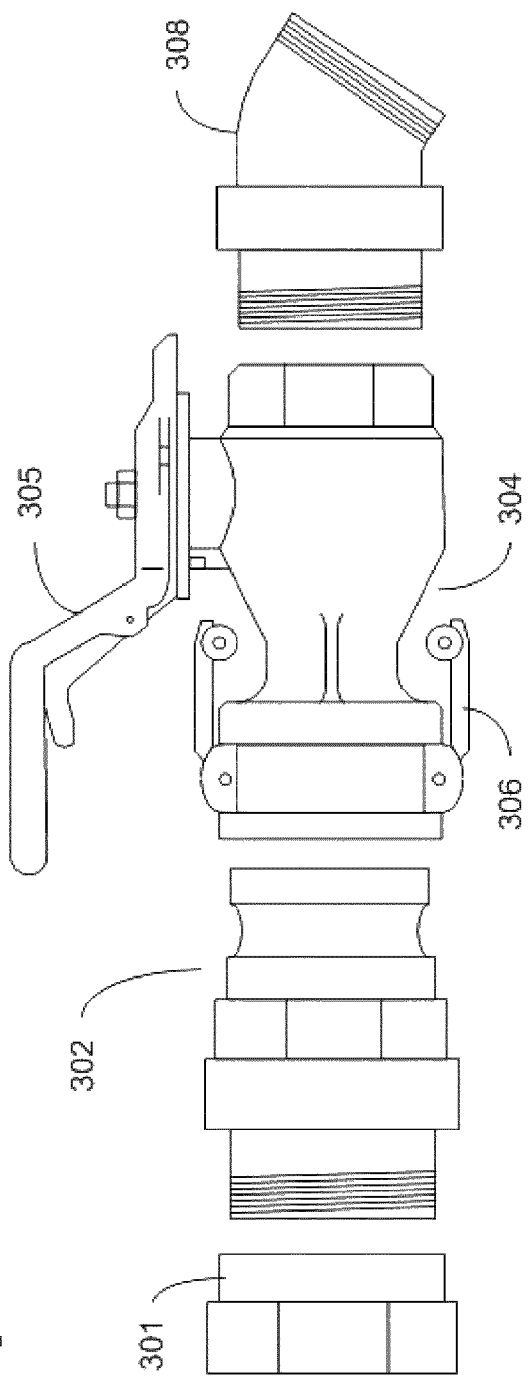
FIG. 3A shows an exploded view of a detailed embodiment of the invention.
Figure 3B:
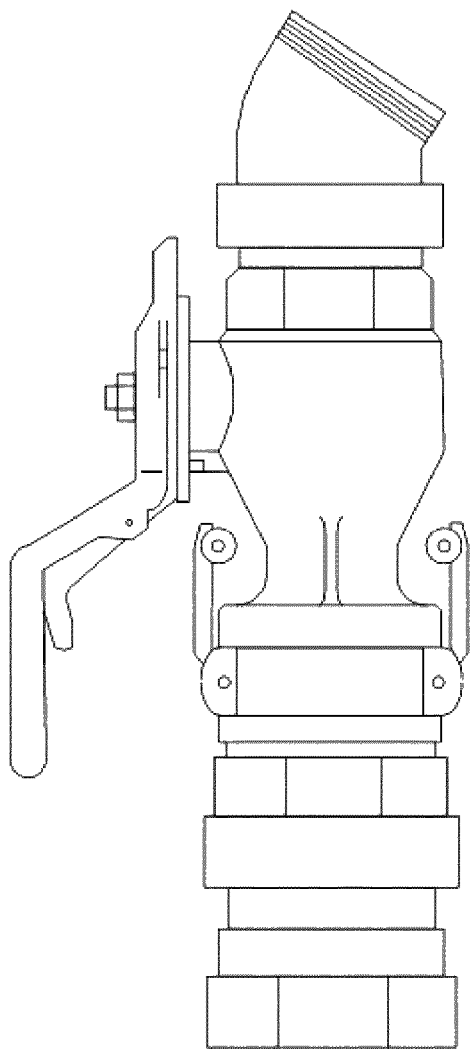
FIG. 3B shows an assembled view of an embodiment of the invention.

FIG. 3A shows an exploded view of an embodiment the quick-disconnect connector. The coupler and adapter of this embodiment are marketed under the brand name Maxi-Dry® by the PT Coupling Company of Enid, Okla., and are sold as parts of a dry-disconnect coupling that is primarily used for the transfer of hazardous liquids. The connector consists of adapter 302 and coupler 304 and the appropriate fittings required to attach the adapter to a fire hose 301 and to attach the coupler to a standard inlet fitting on a fire engine 308. In a preferred embodiment the adapter 302 is a male fitting and includes an integrated valve assembly such that water cannot flow through the assembly unless the valve is opened. The internal structure of the quick-disconnect connector is shown in FIG. 4, which is discussed below. The coupler 304 comprises a latching mechanism (not shown) activated by handles 306 to ensure secure connection of the adapter 302 into the coupler 304, especially when the assembly is under pressure. This embodiment includes a second valve in coupler 304 activated by lever 305 which also opens a spring-loaded valve in the adapter 302. Another embodiment consists of an angled fitting 308 that is sized and threaded for attachment to a fire engine standard inlet fitting. The fitting 308 is angled such that when connected to a fire engine inlet manifold and thereby elevated above the ground, a smooth connection to the hose is enabled without a sharp bend or kink. In a preferred embodiment the bend is 150 degrees. The fitting would be known in the art as a 30-degree elbow. FIG. 3B depicts the fitting of FIG. 3A with the parts in mated condition.

Figure 4A:
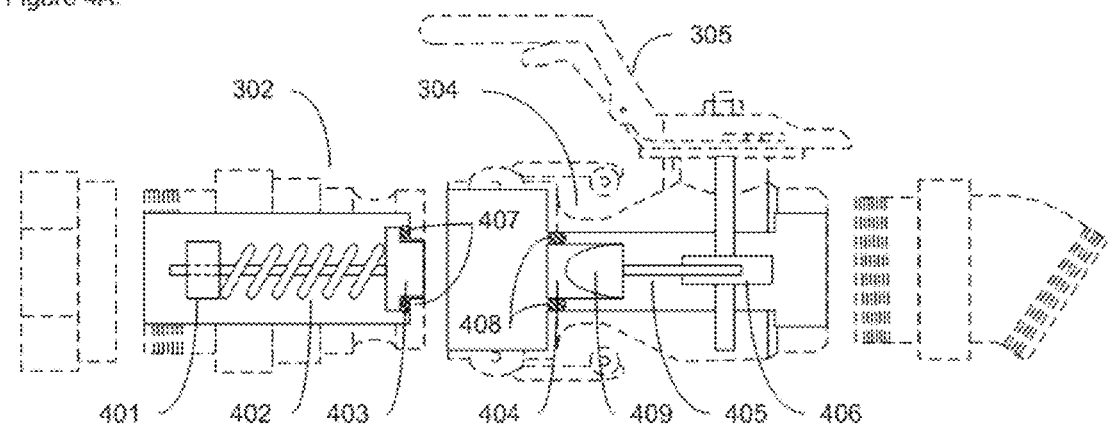
FIG. 4A shows an exploded view of an embodiment of the invention showing the internal parts.

FIG. 4A shows the internal structure of this embodiment of the quick-disconnect connector in an exploded view. Adapter 302 includes an integrated valve comprising plug 403 that seals against end gasket 407 and is held in closure by spring 402 that acts against internal support 401. Coupler 304 includes an integrated valve comprising piston 404 that seals against lateral gasket 408 and is actuated by arm 405 connected to cam 406 which is rotated using lever 305. Piston 404 incorporates a beveled region 409 that provides spacing from gasket 408 when the piston is extended through gasket 408 by rotating cam 406.

Figure 4B:
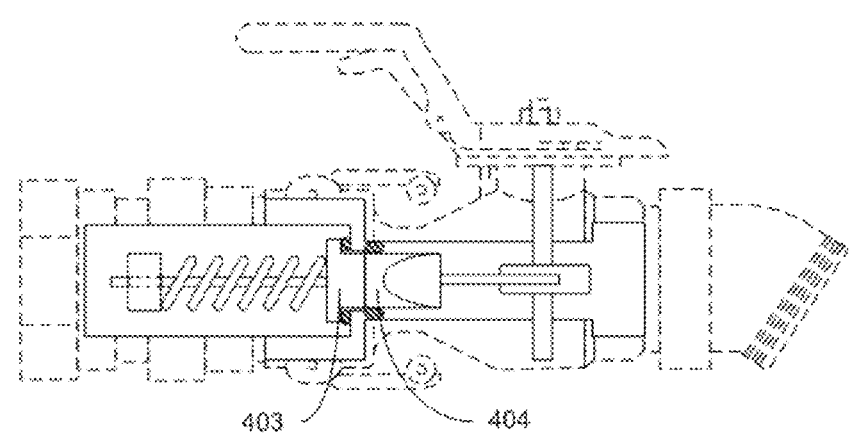
FIG. 4B shows an assembled view of an embodiment of the invention showing the internal parts with both valves closed.

FIG. 4B shows the internal structure of this embodiment of the quick-disconnect connector in mated condition and with both valves in the closed position. In the mated condition the faces of plug 403 and piston 404 abut.

Figure 4C:
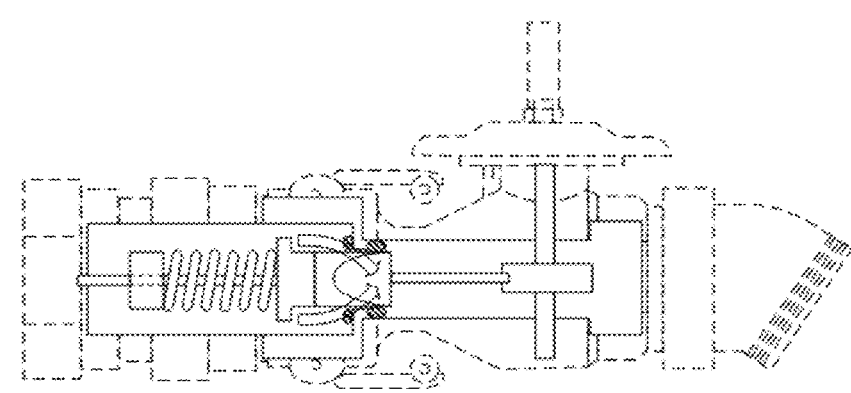
FIG. 4C shows an assembled view of an embodiment of the invention showing the internal parts with both valves open.

FIG. 4C shows the internal structure of this embodiment of the quick-disconnect connector in mated condition and with cam 406 rotated using lever 305 to extend piston 404 into adapter 302. The movement of piston 404 displaces plug 403 and allows water flow around the valve elements as shown by the arrows in FIG. 4C, thus supplying water to the fire engine. In the case that a rapid escape is warranted, the lever 305 is rotated to return both valves to the closed position shown in FIG. 4B and adapter 302 is released from coupler 304 using the latching mechanism activated by handles 306, the fire hose is dropped away and the fire engine can drive away without having to close the valve at fire plug 101.

A different embodiment of the invention is illustrated in FIGS. 5-7. FIG. 5 shows the external structure of a quick-disconnect connector in which the lever 508 controlling the valve integrated into adapter 502 is incorporated directly into the adapter. FIG. 5A shows an exploded view of the quick-disconnect connector. The connector consists of adapter 502 and coupler 505 and the appropriate fitting required to attach the adapter to a fire hose 501. In a preferred embodiment the adapter 502 is a male fitting and includes an integrated valve assembly such that water cannot flow through the assembly unless the valve is opened and the coupler is threaded 506 to allow direct attachment to the fire engine inlet. The internal structure of the quick-disconnect connector is shown in FIGS. 6 and 7, which are discussed below. The coupler 505 comprises a latching mechanism (not shown) activated by handles 504. It also includes a separate spring-loaded safety mechanism comprising movable catch 503 that removably attaches to ridge 507 fabricated on adapter 502 to ensure secure connection of the adapter 502 into the coupler 505, especially when the assembly is under pressure and attempt is made to disconnect the adapter from the couple without first shutting off the valve 502. This embodiment also includes a lever 508 that operates the integrated valve within adapter 302. FIG. 5B shows the quick-disconnect connector with the parts in mated condition.

Figure 5A:
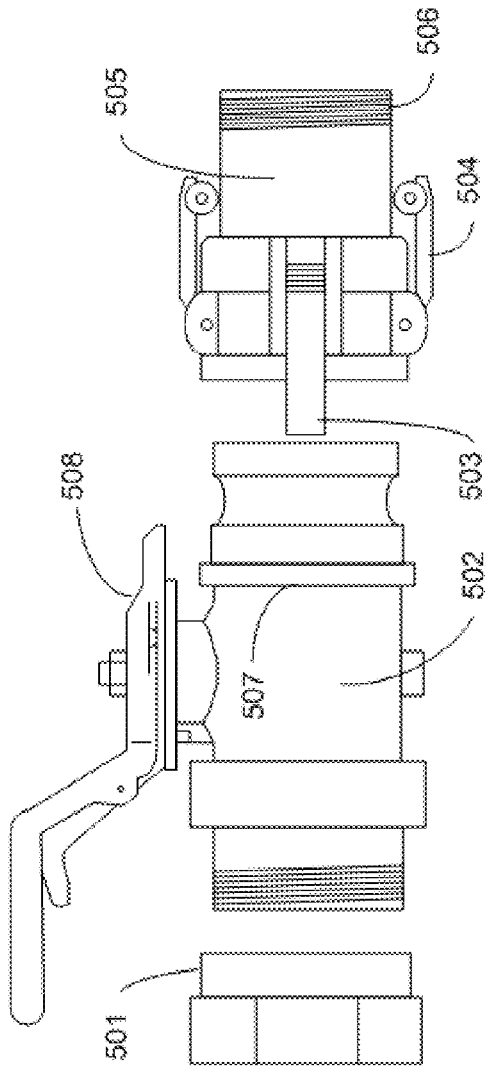
FIG. 5A shows an exploded view of an alternative embodiment of the invention.
Figure 5B:
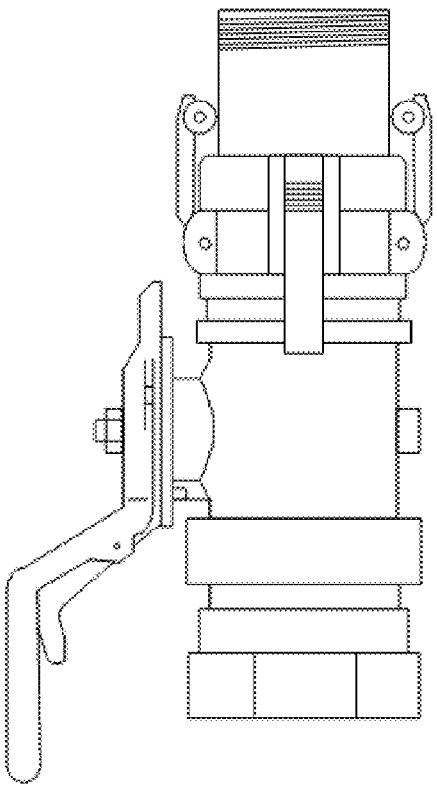
FIG. 5B shows an assembled view of the embodiment of FIG. 5A.
Figure 5C:
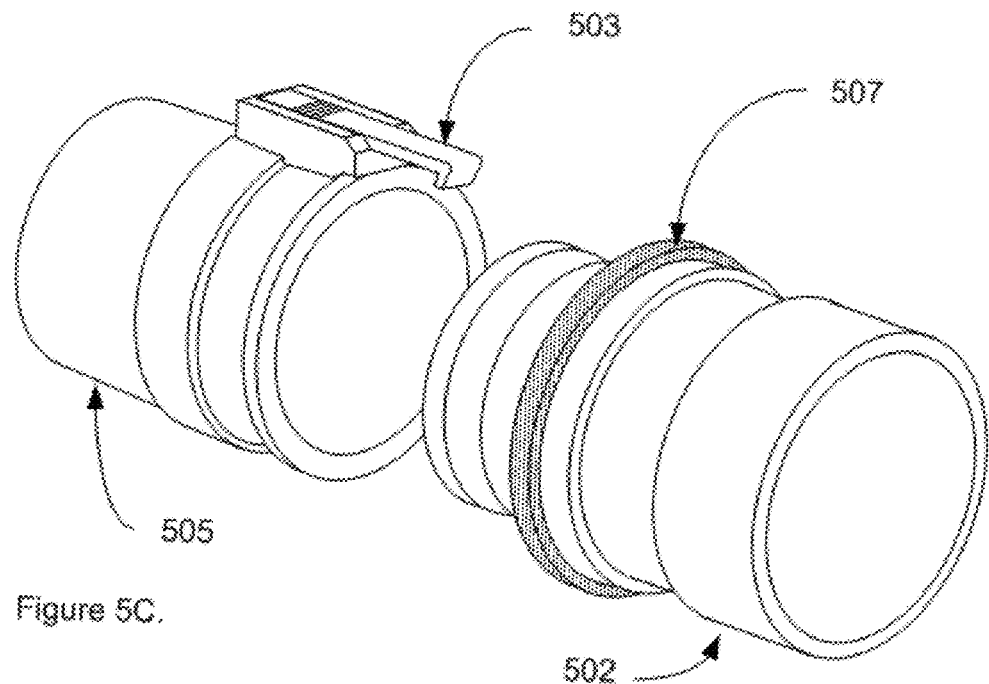
FIG. 5C shows a simplified perspective view of the embodiment of FIG. 5A illustrating the safety catch.
Figure 5D:
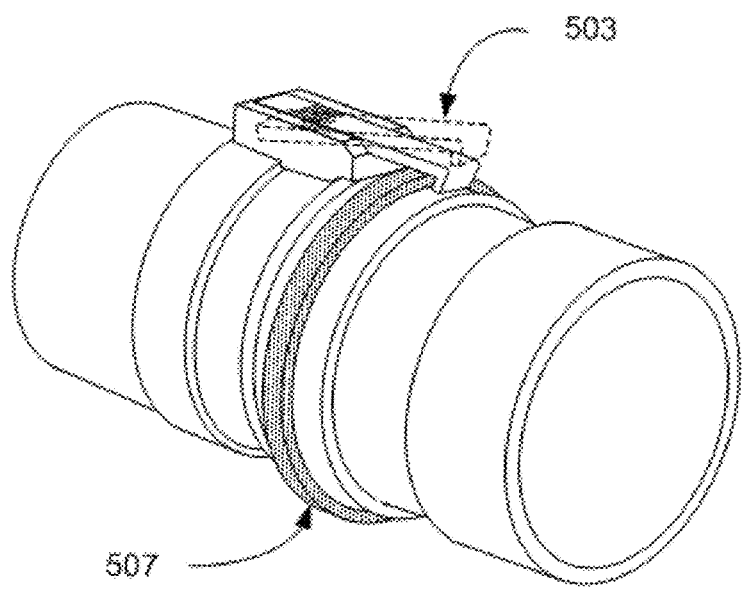
FIG. 5D shows a simplified perspective view of the assembled embodiment of FIG. 5A illustrating the safety catch.

The operation of the safety catch 503 removably attaching to ridge 507 is illustrated more completely in the perspective views in FIGS. 5C and 5D where the latching mechanism handles and the valve structure are omitted for clarity. FIG. 5D shows both the open and closed positions of the movable catch 503. In another embodiment, not shown, the safety catch 503 is incorporated on the adapter 302 and the ridge 507 is fabricated on the coupler 505.

FIGS. 5E and 5F illustrate a different embodiment modified to make it easier to connect the adapter on a charged water hose to the coupler mounted on the truck. The modifications include the addition of flexible coupler section 511 and the addition of high pressure swivel adapter section 510. The flexible coupler section 511 is mounted downstream of the latching mechanism and allows for movement of the latching mechanism activated by handles 504 to more easily align with the adapter attached to a charged hose which is both stiff and heavy. The high pressure swivel adapter section 510 is mounted upstream of the integrated valve assembly and allows the valve lever 508 to be rotated to a convenient position to control water flow after the hose is charged (under pressure) and prior to making the connection with the coupler.

Figure 5G:
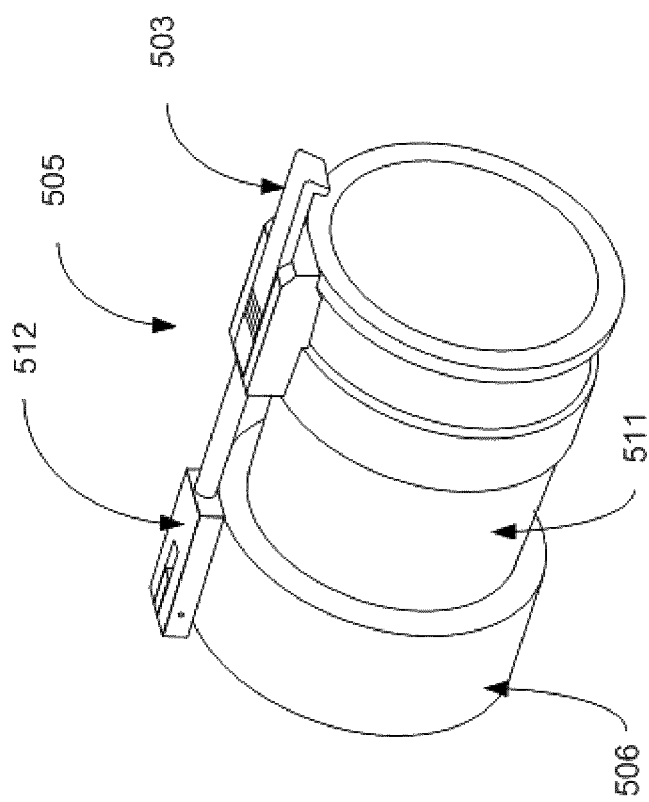
FIG. 5G shows a simplified perspective view of the embodiment of FIG. 5E illustrating a clevis used to support the flexible section.

The flexible coupler section 511 can be a short length of hose or, alternatively, a short length of any flexible piping that will withstand the pressure of the water supply. If a section of hose is used, an optional clevis 512, as shown in the simplified perspective view in FIG. 5G, can be used to prevent kinking of the flexible section when not charged. The clevis 512 in FIG. 5G is shown attached at one end to the threaded coupler fitting 506, and at the other end to the rear of the mount of the safety catch 503. An alternative embodiment employs a section of flexible piping for the hose that can be self supporting when not charged. Yet another alternative embodiment employs a strip of spring material in place of the clevis to support the uncharged hose.

Figure 6A:
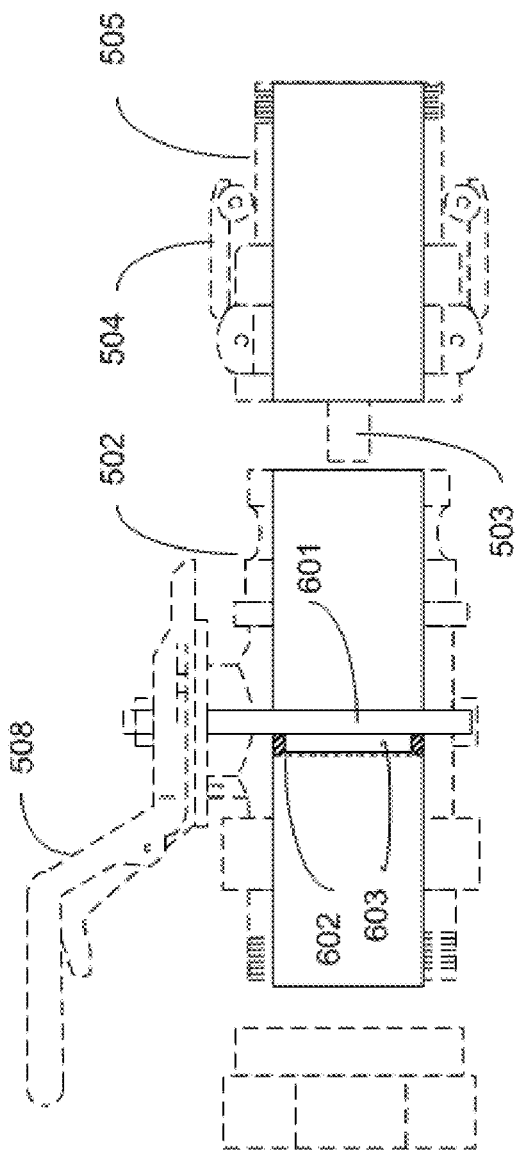
FIG. 6A shows an exploded view of an embodiment of the invention showing the internal parts with the butterfly valve closed.
Figure 6B:
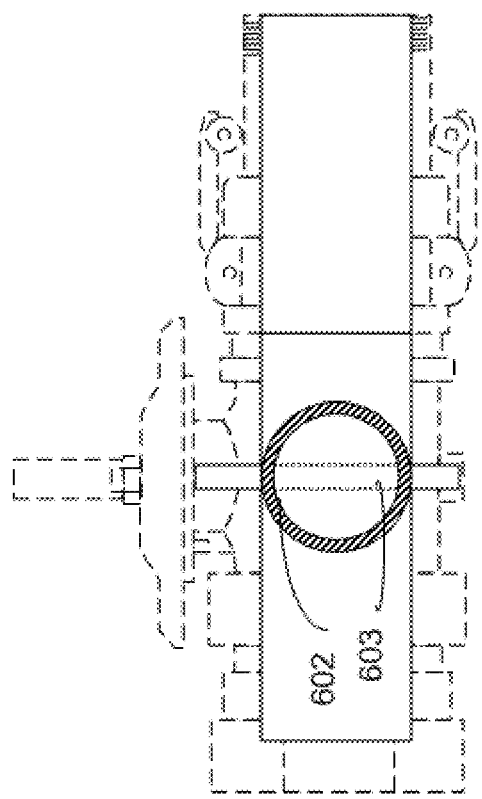
FIG. 6B shows an assembled view of the embodiment of FIG. 6A showing the internal parts with the butterfly valve open.

FIG. 6 shows an embodiment in which the valve integrated into adapter 502 is a butterfly valve. FIG. 6A shows the exploded view of the quick-disconnect connector with circular valve plate 603 rotated into the closed position. Valve plate 603 is attached to shaft 601 which is rotated by lever 508. Valve plate 603 is fitted with o-ring gasket 602 which seals against the interior wall of the adapter when the valve is in the closed position. FIG. 6B shows the quick-disconnect connector with parts in mated condition, and with lever 508 rotated by 90 degrees so that valve plate 603 is oriented parallel to the water flow direction thereby allowing water to flow into the fire engine. In the case that a rapid escape is warranted, the lever 508 is rotated to return valve plate 603 to the closed position shown in FIG. 6A and adapter 502 is released from coupler 505 by releasing safety catch 503 and the latching mechanism activated by handles 504, the fire hose is dropped away and the fire engine can drive away without having to close the valve at fire plug 101.

Figure 7A:
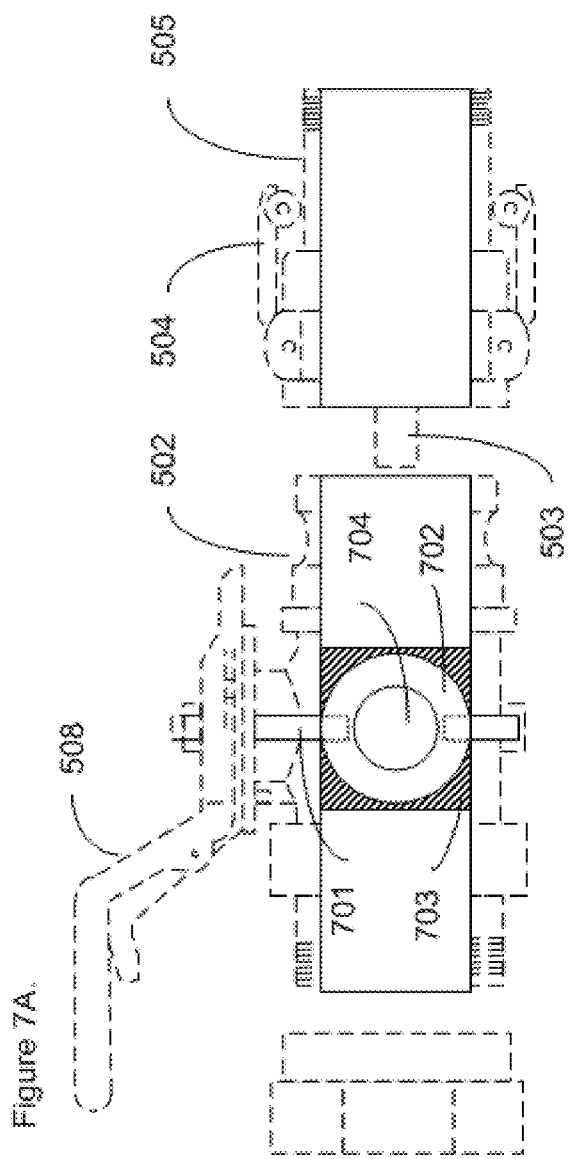
FIG. 7A shows an exploded view of an embodiment of the invention showing the internal parts with the ball valve closed.
Figure 7B:
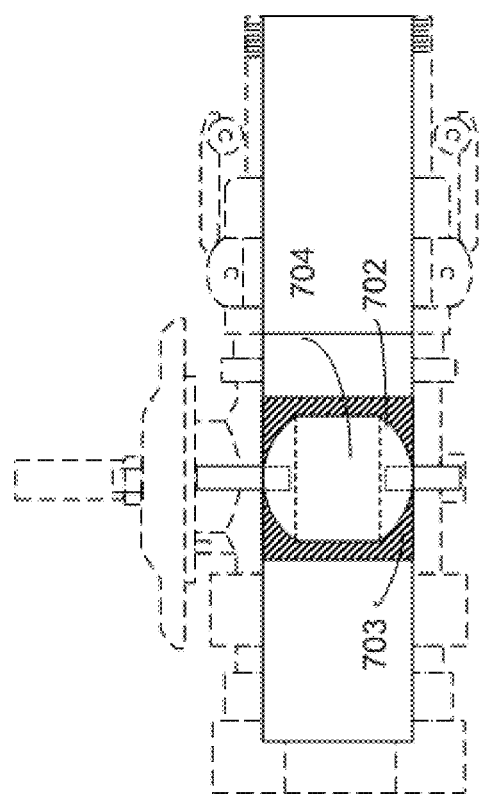
FIG. 7B shows an assembled view of the embodiment of FIG. 7A showing the internal parts with the ball valve open.

FIG. 7 shows an embodiment in which the valve integrated into adapter 502 is a ball valve. FIG. 7A shows the exploded view of the quick-disconnect connector with valve ball 702 rotated into the closed position with the valve channel 704 perpendicular to the water flow direction. Valve ball 702 is attached to shaft 701 which is rotated by lever 508. Valve ball 702 is fitted into gasket fitting 703 which seals the opening of the valve chamber 704 when the valve is in the closed position. FIG. 7B shows the quick-disconnect connector with parts in mated condition, and with lever 508 rotated by 90 degrees so that valve ball 702 is oriented with the valve channel 704 parallel to the water flow direction thereby allowing water to flow into the fire engine. In the case that a rapid escape is warranted, the lever 508 is rotated to return valve ball 702 to the closed position shown in FIG. 7A and adapter 502 is released from coupler 505 by releasing safety catch 503 and the latching mechanism activated by handles 504, the fire hose is dropped away and the fire engine can drive away without having to close the valve at fire plug 101.

Figure 8:
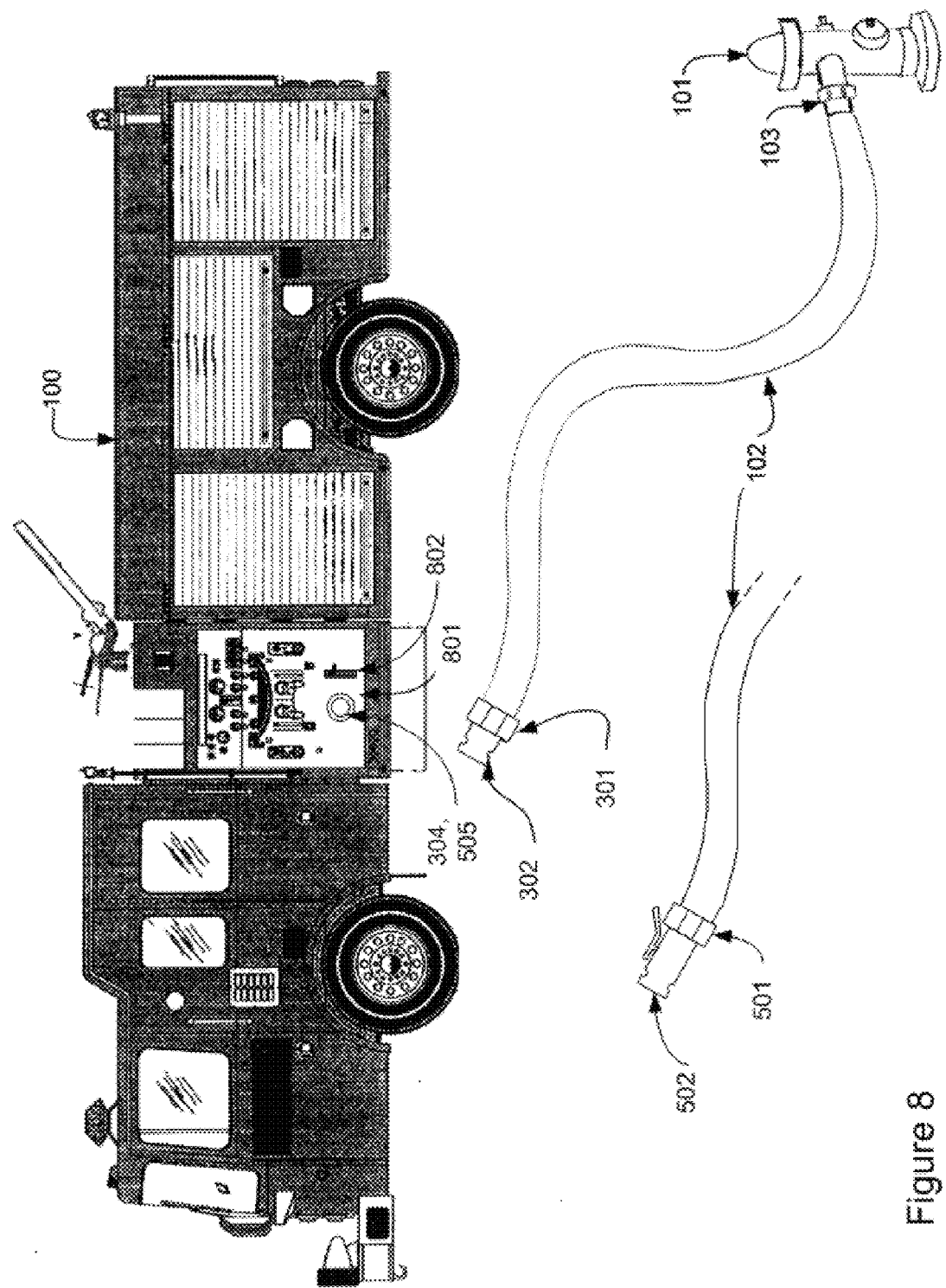
FIG. 8 shows a detailed view of an embodiment of the invention.

In another embodiment shown in FIG. 8, the coupler 304, 505 is integrated into the manifold and valve structure of the engine 801. The appropriate release levers and valves are controlled through integrated fire engine controls 802. This embodiment eliminates the need for special fittings to be attached to the engine. Another embodiment shown in FIG. 8 comprises a fire engine fit with integrated fittings 801 to accommodate quick-disconnect connector adapter 302 attached to a fire hose 102 using fitting 301 or alternatively quick-disconnect connector adapter 502 using fitting 501.

Another embodiment shown in FIG. 9 comprises a quick-disconnect connector 901 integrated directly to the inlet port of a piston intake valve 902.

Another embodiment includes the method of using a quick-disconnect connector attached to a fire engine. Referring to FIG. 2, a fire engine 100 arrives at the scene of a fire and the fire personnel attach coupler 203 to the fire engine. Fire hose 102 is unrolled and adapter 202 is mated with coupler 203 on the fire engine. The opposite end of fire hose 102 is attached to a hydrant 101 through one of various fittings 103 known in the art. The hydrant 101 is then activated through turning the appropriate valve on the hydrant thus supplying water through the hose 102 to the fire engine 100. Valves on the coupler 203 and incorporated into the fire engine 100 may be turned to initiate flow. Should the fire engine need to make a rapid retreat from the fire zone, the valve integrated into the adapter 202 is closed and the adapter 202 is detached from the coupler 203 and the fire engine may drive away. Because the adapter 202 incorporates an integrated valve, the hose 102 will remain charged with water but there will be no flow. The hydrant may be left in an on position and the hose 102 left behind to facilitate a rapid departure. It should be noted that the drawings shown are not to scale and the distance from the fire engine 100 to the hydrant 101 may be a considerable distance. The length of hose 102 may be such that it could not be rapidly recovered in an emergency retreat situation. The invention enables rapid connection and even more rapid disconnection. This is especially important in a firestorm situation where the fire engine and personnel may need to make a rapid escape from the fire scene.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

SUMMARY

A fire engine hose connector system and a method for using the system are reported. The system allows for rapid connection between the fire hose and the fire engine, and more importantly the system enables even more rapid disconnection. The fire engine and fire fighting personnel may make a rapid escape form an overtaking wildfire. The ability to rapidly disconnect and escape from the fire scene allows the fire engine and personnel to access hydrant supplies that would otherwise not be available due to safety procedures that preclude connection when the long disconnect time requirements of prior art connectors place the escape of the fire engine and personnel at risk in a rapidly moving fire.

What is claimed is:

1. A method of connecting a fire hose to and disconnecting a fire hose from a fire engine, said method comprising:
    a) attaching an adapter to a first end of a fire hose the fire hose having a second end for attaching to a fire hydrant,
    b) said adapter comprising a cylinder having a first end, a second end and walls, said first end including a fitting for attachment to a fire hose and said second end comprising a cylindrical quick disconnect fitting and a valve located between the first end and the second end, said valve actuated by a lever attached to a shaft that penetrates through the walls of the cylinder, wherein said valve controls flow of water through the adapter such that when the valve is in a closed position no water can flow through the adapter, and a circumferential ridge located on the adapter between the valve and the second end of the adapter,
    c) attaching a coupler to a water supply input on the fire engine, said coupler comprising a cylinder having a fitting at a first end of said coupler for attaching to the fire engine water supply input and a fitting at a second end with a size and form for mating with the quick disconnect fitting on the adapter, said coupler further including at least one spring-loaded safety lever, said safety lever comprising a first end and a second end and attached to a fulcrum incorporated in the coupler between the first end and the second end, the second end of the safety lever extending beyond the second end of the coupler, a spring located between the first end and the body of the coupler, such that pressing on the first end of the safety lever compresses the spring and lifts the second end of the safety lever, the second end of the safety lever comprising a hook that, when the coupler and the adapter are fit together, can engage the circumferential ridge located on the adapter and thereby prevent the adapter and coupler from being separated until both the at least two actuator levers are actuated to an unlocked position and the first end of the safety lever is pressed,
    d) actuating lever actuators on said coupler, said actuators operating a latching mechanism such that when the adapter is inserted into the coupler and the actuators are actuated to a locked position the coupler and adapter are held together forming a water tight seal, thereby connecting the fire hose to the fire engine,
    e) pressing on the first end of the safety lever and actuating the lever actuators on said coupler to an unlocked position and removing the adapter from the coupler, thereby disconnecting the fire hose from the fire engine,
    f) whereby the fire hose may be connected to the hydrant and the hose charged with water by turning a valve on the hydrant with the valve on the adapter in a closed position and the adapter may be coupled and uncoupled from the fire hose while the fire hose remains charged with water.

2. The method of claim 1 wherein the fitting on the second end of the adapter is a male quick connect fitting and the fitting on the second end of the coupler is a female quick connect fitting.

3. The method of claim 1 wherein the fitting on the second end of the adapter is a female quick connect fitting and the fitting on the second end of the coupler is a male quick connect fitting.

4. A method of connecting a fire hose to and disconnecting a fire hose from a fire engine, said method comprising:
    a) attaching an adapter to a first end of a fire hose the fire hose having a second end for attaching to a fire hydrant,
    b) said adapter comprising a cylinder having a first end, a second end and walls, said first end including a fitting for attachment to a fire hose and said second end comprising a cylindrical quick disconnect fitting and a valve located between the first end and the second end said valve actuated by a lever attached to a shaft that penetrates through the walls of the cylinder, wherein said valve controls flow of water through the adapter such that when the valve is in a closed position no water can flow through the adapter,
    c) attaching a coupler to a water supply input on the fire engine, said coupler comprising a cylinder having a fitting at a first end of said coupler for attaching to the fire engine water supply input and a fitting at a second end with a size and form for mating with the quick disconnect fitting on the adapter, said coupler including at least two lever actuators, said actuators operating a latching mechanism such that when the adapter is inserted into the coupler and the actuators are actuated to a locked position the coupler and adapter are held together forming a water tight seal, a circumferential ridge located on the coupler between the valve and the second end of the adapter, said adapter further including at least one spring-loaded safety lever, said safety lever comprising a first end and a second end and attached to a fulcrum incorporated in the adapter between the valve actuator and the second end, the second end of the safety lever extending beyond the second end of the adapter, a spring located between the first end and the body of the adapter, such that pressing on the first end of the safety lever compresses the spring and lifts the second end of the safety lever, the second end of the safety lever comprising a hook that, when the coupler and the adapter are fit together, can engage the circumferential ridge located on the coupler and thereby prevent the adapter and coupler from being separated until both the at least two actuator levers are actuated to an unlocked position and the first end of the safety lever is pressed,
    d) actuating lever actuators on said coupler, said actuators operating a latching mechanism such that when the adapter is inserted into the coupler and the actuators are actuated to a locked position the coupler and adapter are held together forming a water tight seal, thereby connecting the fire hose to the fire engine, e) pressing on the first end of the safety lever and actuating the lever actuators on said coupler to an unlocked position and removing the adapter from the coupler, thereby disconnecting the fire hose from the fire engine, f) whereby the fire hose may be connected to the hydrant and the hose charged with water by turning a valve on the hydrant with the valve on the adapter in a closed position and the adapter may be coupled and uncoupled from the fire hose while the fire hose remains charged with water.

5. The method of claim 4 wherein the fitting on the second end of the adapter is a male quick connect fitting and the fitting on the second end of the coupler is a female quick connect fitting.

6. The method of claim 4 wherein the fitting on the second end of the adapter is a female quick connect fitting and the fitting on the second end of the coupler is a male quick connect fitting.

* * * * *